Aug. 22, 1961 T. L. GREENWOOD ET AL 2,996,915
LIQUID LEVEL MEASUREMENT SYSTEM
Filed Feb. 12, 1959 2 Sheets-Sheet 1

THOMAS L. GREENWOOD
ALBERT E. SCHULER
INVENTORS,

BY S. J. Rotondi
a. T. Dupont
H. M. Snyder
C. A. Phillips
ATTORNEYS.

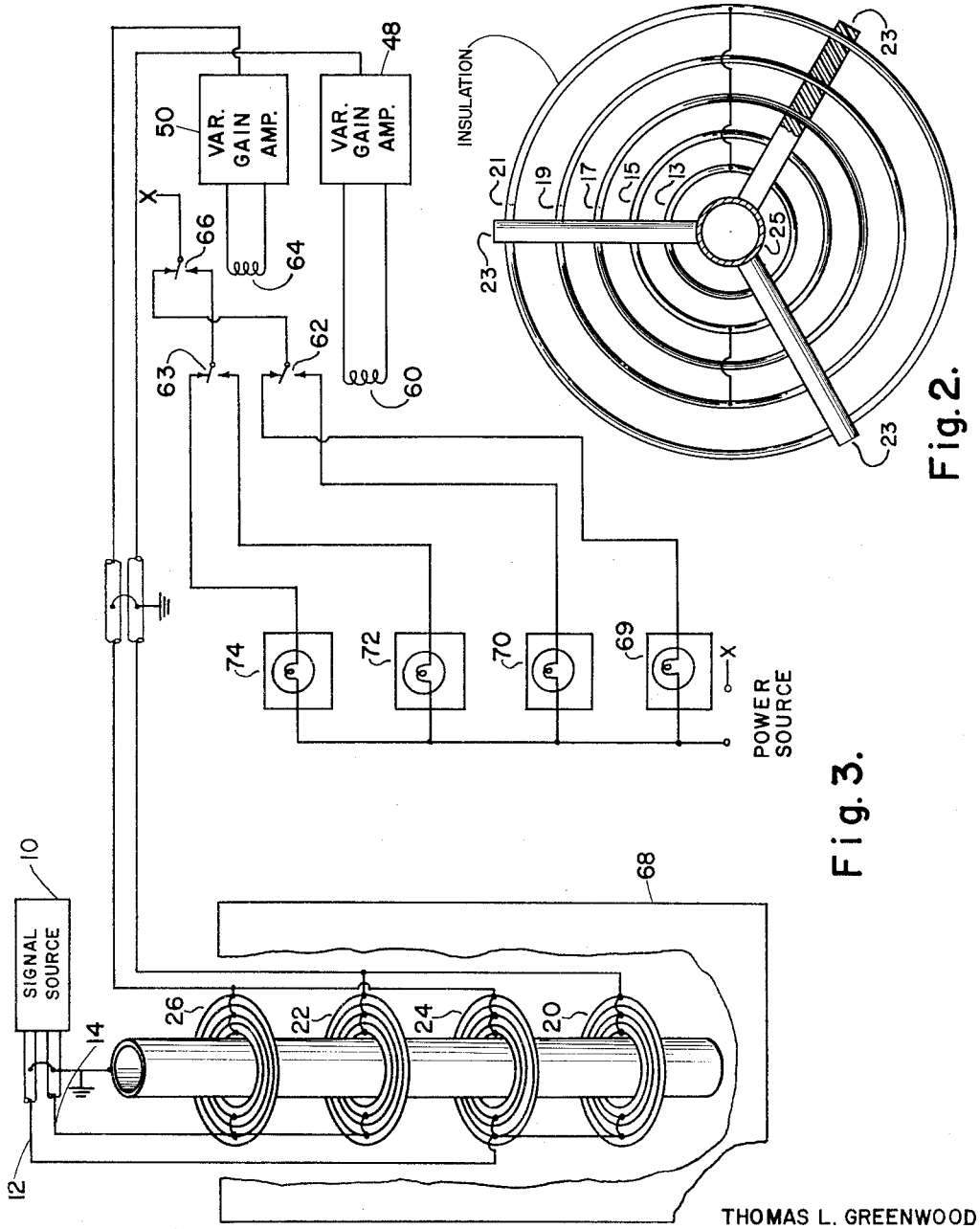

United States Patent Office 2,996,915
Patented Aug. 22, 1961

2,996,915
LIQUID LEVEL MEASUREMENT SYSTEM
Thomas L. Greenwood and Albert E. Schuler, Huntsville, Ala., assignors to the United States of America as represented by the Secretary of the Army
Filed Feb. 12, 1959, Ser. No. 792,931
9 Claims. (Cl. 73—304)
(Granted under Title 35, U.S. Code (1952), sec. 266)

The invention described herein may be manufactured and used by or for the Government for governmental purposes without the payment of any royalty thereon.

This invention relates to liquid level detection and measurement systems and particularly to a high accuracy system suitable for use as a reference in the calibration of other liquid level measurement equipment. It has been found that in many applications where liquid measurements are made, particularly where continuous measurement equipment is employed to measure liquid flow or liquid level, that a need exists for an apparatus capable of checking the accuracy of such equipment, and where indicated, for recalibration of the equipment. It is the object of the present invention to provide such an apparatus.

In accordance with the invention a liquid level indicating apparatus is constructed of a series of capacitor assemblies, one assembly for each elevation point at which liquid level in an inclosure is to be measured. Each of the capacitor assemblies consists of two or more adjacent electrical conductors electrically insulated to form a capacitor.

Two of the capacitors are connected as a pair to form adjacent arms of an electrical bridge. The other two arms of each bridge may conveniently consist of residual capacity inherent in the interconnecting cables. Each bridge is energized by an alternating current which, in accordance with one feature of the invention, has a frequency below the radio frequency range or approximately in the audio frequency range. The output of each bridge is fed to a detection and indicating means which, in accordance with another feature of the invention, includes means for equalizing the signals from each bridge. In one form of the invention the detection and indicating means includes an amplifier for each bridge, or bridge channel, and each amplifier is provided with an adjustable gain control.

To briefly examine the operation of the device, assume that the tank in which the capacitor assemblies are placed has an initial level below the lowest capacitor assembly. In this posture it is apparent that the capacitor bridge of which it is a part will be balanced and there will be a null in the bridge circuit output. Next assume that the level liquid is raised to a point which covers the conductors of the lowest capacitor assembly. Due to the change in dielectric constant, the capacity of the lower capacitor will increase and the bridge will unbalance providing a maximum bridge output. If now the level is raised to cover an upper capacitor of the bridge, its capacity will be increased similarly and the bridge will be rebalanced and provide again a null output. It is thus possible to obtain two indications of level from a single bridge circuit. In order to get a positive indication of the liquid level zone (the space between adjacent capacitors) at all times, the applicant found that the capacitors of one bridge should not be adjacent but should be separated by or over lapped with the capacitors of another bridge. In this way one bridge will always be unbalanced and thus provide a discrete output until the top capacitor is covered. By a combination of bridge output signals, to be described below, a discrete output for each liquid level zone is obtained.

Particularly significant in arriving at the present invention was the discovery that a myriad of difficulties experienced in practice in the development of a successful device were caused by unapparent influences on bridge balance and therefore that means must be found in many instances to correct for these influences. As will be further discussed below, the applicant found that the solution to this problem lay in providing a differential capacitor connected across each bridge.

This invention, together with further objects and advantage thereof, will best be understood by reference to the following description taken in connection with the accompanying drawing in which:

FIGURE 2 shows a view of an embodiment of a capacitor of the type contemplated for an embodiment of the invention; and FIGURE 3 is a combined schematic-diagrammatic view of the basic portion of an embodiment of the invention.

Figure 1:
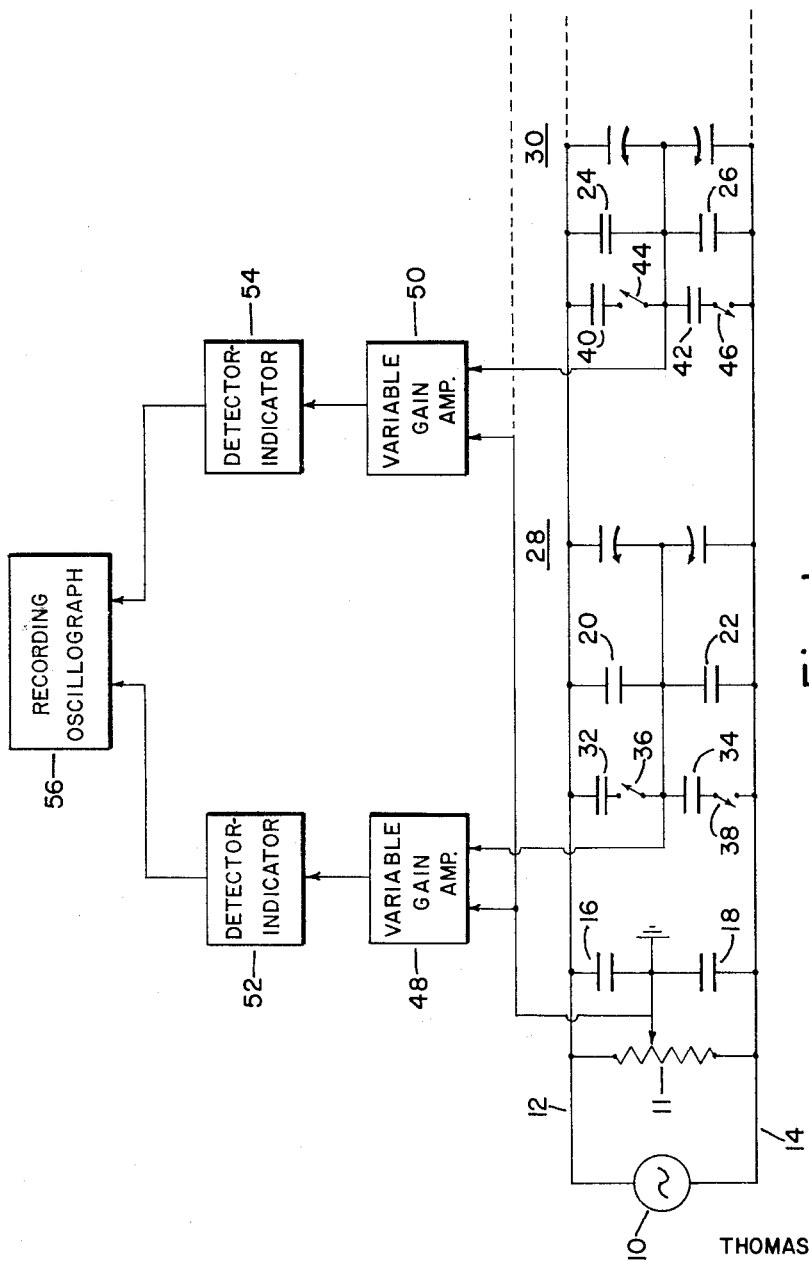
FIGURE 1 shows a schematic circuit diagram of the electrical interconnection of an embodiment of the invention.

Referring now ot FIGURE 1, an alternating current source 10, across which is connected a balancing potentiometer 11, supplies a balanced voltage across conductors 12 and 14 and thus across a first electrical bridge consisting of reference capacitance 16 and 18 and ring shaped or ring capacitors 20 and 22, and across a second bridge consisting of capacitance 16 and 18, and ring capacitors 24 and 26. Capacitance 16 and 18 may, as previously indicated, consist of residual cable capacitance such as provided by coaxial cable interconnecting the ring capacitors and the alternating current source. Differential capacitors 28 and 30 are connected across, respectively, the first and second bridges and provide means of compensating for undesired unbalance between capacitors 20 and 22 and between capacitors 24 and 26, respectively. Calibration capacitors 32 and 34 are connected through switches 36 and 38 across the first bridge ring capacitors 20 and 22 respectively. When one of these calibration capacitors is in circuit with a ring capacitor, it simulates the effect of increased capacity which occurs when the liquid level is raised to approximately the mid-point of this ring capacitor. Calibration capacitors 40 and 42 connected through switches 44 and 46 perform a similar function for the second bridge which includes ring capacitors 24 and 26.

The output of the first bridge is connected to the input of variable gain amplifier 48, and the output of the second bridge is connected to the input of variable gain amplifier 50. The output of amplifier 48 is connected to appropriate detector-indicator 52, which for example, may provide a light signal when the bridge output to the amplifier reaches a predetermined level. The output of amplifier 50 is similarly connected to detector-indicator 54. An output from each bridge is also supplied to recording oscillograph 56 and may be supplied thru detector-indicators 52 and 54 as shown.

Referring now to FIGURE 2, the capacitor shown therein is the type contemplated for capacitors 20, 22, 24 and 26, shown schematically in FIGURE 1. This capacitor consists of five concentric rings, 13, 15, 17, 19 and 21, with rings 15 and 19 electrically connected to form one plate of the capacitor and rings 13, 17 and 21 electrically connected to form the other plate, said rings being substantially openly spaced permitting free passage of fluid between rings. The capacitor is mounted on insulators 23 connected to a metal cylinder supporting member 25 which is at a ground, or reference potential. Excellent results have been obtained using metal rings of ⅛ inch tubing for each ring and with a ring-to-ring spacing of also approximately ⅛ inch. As illustrated the rings may be covered with an electrical insulation and thus made adaptable for use with conductive as well as nonconductive liquids.

FIGURE 3 shows diagrammatically the interrelation of the ring capacitors and electrical circuit employed to provide a visual indication when the liquid level reaches one of the ring capacitors, and between which two ring capacitors, or zone, the level appears. Signal source 10 applies a signal balanced with respect to ground on coaxial conductors 12 and 14. Ring capacitors 20 and 22 are connected in series between these conductors as are capacitors 24 and 26. Two electrical bridges are formed, a first consisting of capacitors 20 and 22 and the cable capacity of coaxial conductors 12 and 14; and a second bridge consisting of capacitors 24 and 26 and the capacity of coaxial conductors 12 and 14. The output of the first of these bridges is fed to amplifier 48 and the output of the second is fed to amplifier 50. The output of amplifier 48 is connected to energizing coil 60 associated with doublepole, double-throw relay contacts 62 and 63, and the output of amplifier 50 is connected to the energizing coil 64 associated with single-pole, double-throw relay contacts 66.

Assume that the liquid level in tank 68 is below any of the capacitors and thus both bridges are balanced. Accordingly, the output of the bridges and therefore the output of amplifiers 48 and 50 will be at a null. In this posture neither relay coil 60 nor 64 will be energized and only signal zone light 69 which is connected thru the contacts associated with these coils will be energized. If the liquid level rises to immerse ring capacitor 20, the first bridge will become unbalanced. The output from amplifier 48 will rise, the movable contact of contacts 62 and 63 will be pulled to its lower position, signal light 70 will be energized and signal light 69 will go off. Light 70 will remain on until the liquid rises to cover ring capacitor 24 and the second bridge unbalances. This will result in an increased output from amplifier 50 and the moving contact of contacts 66 being pulled to its lower position, thus opening the circuit to signal light 70 (extinguishing that light) and closing the circuit to signal light 72 (turning this light on). When the liquid level is raised to cover capacitor 22, the first bridge is rebalanced, the output of amplifier 48 decreases and the movable contact of contacts 62 and 63 moves to its upper position. This opens the circuit to signal light 72 and closes it to signal light 74 resulting in light 72 being turned off and light 74 turned on. Light 74 will remain on until the liquid level rises to immerse capacitor 26 at which time the second bridge will rebalance and the circuit to signal light 74 will be opened and light 74 will be extinguished. When this occurs, signal light 69 will turn back on. By means of this indicating system four distinct level points are indicated together with three zones between these four points. It will of course be appreciated that the present invention is not limited to a device having a particular number of level indicating points nor to the particular form of indicators illustrated. Similarly no critical dimension is intended for the capacitor plate conductors except that the thickness of these conductors, measured vertically as installed, should be small with respect to their length dimension or diameter if ring shaped. The capacitors lie along or approximate, neglecting thickness, parallel planes. The plane-to-plane spacing may be chosen to give the desired level check points.

While the foregoing is a description of the preferred embodiment, the following claims are intended to include those modifications and variations that are within the spirit and scope of my invention.

The invention having thus been described, what is claimed and desired to be secured by Letters Patent is:

1. A liquid level measuring device comprising a supporting means and a plurality of substantially identical, fixedly spaced ring capacitor assemblies; each assembly comprising a plurality of spaced concentric rings attached to and electrically insulated from said supporting means and including means to provide a substantially open region between rings; each of the adjacent rings of an assembly being electrically insulated and positioned with diametric dimensions substantially along a plane common to other rings of that assembly, the thickness of said rings, measured parallel to the axis of said rings, being small with respect to the diameter of said rings, and said ring assemblies being parallel to each other and having a common axis.

2. A liquid level measuring device comprising a tubular supporting means, a plurality of substantially identical, fixedly spaced capacitor assemblies, each assembly comprising a plurality of spaced electrical conductors positioned lengthwise along a common plane, said conductors being attached to and electrically insulated from said supporting means and including means to provide a substantially open region between conductors, adjacent surfaces of said conductors having a dimension perpendicular to said plane which is small compared with the length of one of said conductors, the common planes associated with the respective assemblies being substantially parallel, a plurality of reference capacitors, at least one electrical bridge, two of said capacitor assemblies being connected to form one side of said electrical bridge, and two of said reference capacitors being connected to form the other side of said bridge, a source of alternating current being connected across opposite terminals of the bridge and an electrical indicator being connected across the other terminals of the bridge, said terminals being the interconnection points between the bridge elements.

3. A liquid level measuring device, as set forth in claim 2, wherein said spaced electrical conductors are in the form of concentric rings, and are coated with an electrical insulation.

4. A liquid level measuring device comprising a supporting means, a plurality of substantially identical capacitor assemblies, each assembly comprising a plurality of spaced electrical conductors being attached to and electrically insulated from said supporting means and including means to provide a substantially open region between conductors, adjacent surfaces of said conductors having a dimension perpendicular to said plane which is small compared with the length of one of said conductors, the common planes associated with the respective assemblies being substantially parallel, a source of alternating current having a pair of output terminals, an electrical amplitude detector having a two terminal input, first and second dual conductor electrical cables, a first conductor of each of said cables being connected to a first terminal of said detector input, and to a point electrically balanced between said A.C. source terminals a first end of the second conductor of each of said cables being connected respectively to said output terminals of said source of alternating current, the second end of the second conductor of said first cable being connected to a first conductor of a first capacitor assembly and the second end of the second conductor of said second cable being connected to a first conductor of a second capacitor assembly, a second conductor of said first and second capacitor assemblies being electrically connected to the second terminal of said detector input.

5. A liquid level measuring device set forth in claim 4 wherein each of said capacitors comprises more than two said conductors, and alternate spaced conductors are electrically connected, and where said source of alternating current operates at a frequency within the audible frequency range.

6. A liquid measuring device as set forth in claim 6, further comprising differential capacitors consisting of a first and second capacitors connected in series between said first conductors of said first and second capacitor assemblies, the common terminal of said first and second capacitors being connected to said second terminal of said detector input.

7. A liquid measuring device as set forth in claim 6, further comprising a calibration capacitor and an electrical switch connected in series between one of said first conductors of said capacitors assemblies and said second terminal of said detector input.

8. A liquid level measuring device as set forth in claim 7, further comprising third and fourth said capacitor assemblies separated by said first capacitor assembly, a second said detector, said third and fourth capacitor assemblies and said second detector being interconnected with said first and second cable conductors in a like manner to that of said first named detector and said first and second capacitor assemblies and the second conductor of said third and fourth capacitor assemblies being electrically connected to the second terminal of said second detector input, first and second relay means connected respectively to the output of said first named detector and said second detector, first, second, third and fourth signal indicators, each having a first and second input terminals connected through said relay means to a power source, said first indicator being responsive to an "off" condition of both said relay means, said second indicator being responsive to an "on" condition of said first relay means and an "off" condition of said second relay means, said third indicator being responsive to an "on" condition of both said relay means, and said fourth indicator being responsive to an "off" condition of said first relay means and an "on" condition of said second relay means.

9. A liquid level measuring device as set forth in claim 8, wherein said first relay means comprises an energizing coil and first and second sets of double throw contacts, said second relay means comprises an energizing coil and a double throw set of contacts, said power source being connected between the movable contact of said second relay means and said first terminal of each of said indicators, said second terminal of said first indicator being connected to the "off" contact of said first set of contacts, said second terminal of said second indicator being connected to the "on" contact of said first set of contacts, said second terminal of said third indicator being connected to the "on" contact of said second set of contacts, the "off" contact of said second relay means being connected to the movable contact of said first set of contacts, and the "on" contact of said second relay means being connected to the movable contact of said second set of contacts.

References Cited in the file of this patent

UNITED STATES PATENTS

| | | |
|---|---|---|
| 1,127,084 | Ogilvie et al. | Feb. 2, 1915 |
| 1,709,601 | Benjamin | Apr. 16, 1929 |
| 2,219,497 | Stevens et al. | Oct. 29, 1940 |
| 2,357,023 | Reid et al. | Aug. 29, 1944 |
| 2,485,579 | Elliott | Oct. 25, 1949 |
| 2,683,371 | Droin et al. | July 13, 1954 |
| 2,766,406 | Schwarzkopf | Oct. 9, 1956 |
| 2,787,783 | Storm | Apr. 2, 1957 |
| 2,868,015 | Haropulos | Jan. 13, 1959 |